(No Model.)
F DOHERTY & E. L. SIES.
TWO WHEELED VEHICLE.
No. 293,720. Patented Feb. 19, 1884.
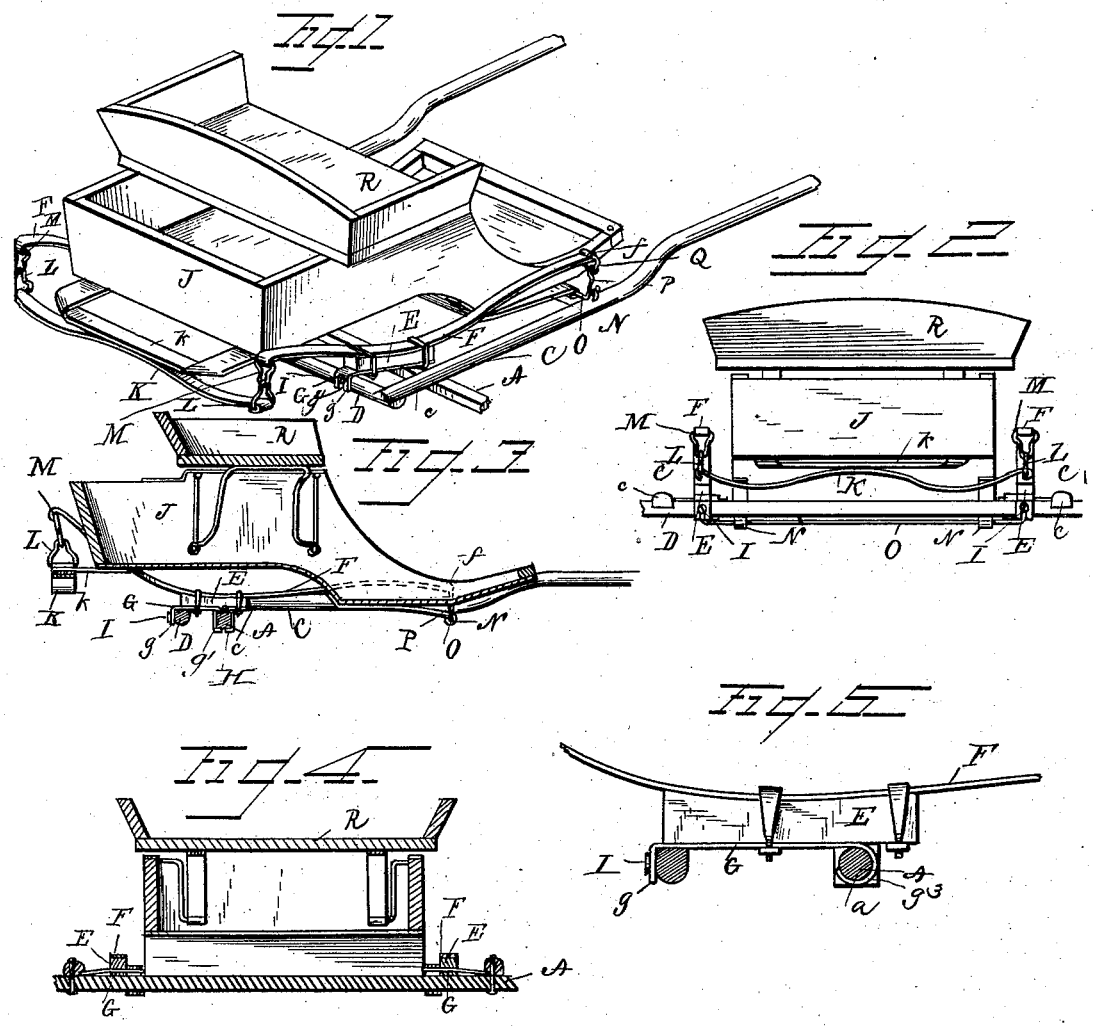
WITNESSES
F. L. Ourand
E. G. Siggers
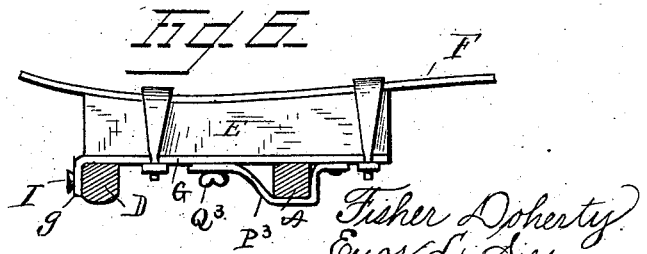
INVENTOR
by C. A. Snow & Co.
Attorneys

UNITED STATES PATENT OFFICE.

FISHER DOHERTY AND ENOS L. SIES, OF CRAWFORDSVILLE, INDIANA.

TWO-WHEELED VEHICLE.

SPECIFICATION forming part of Letters Patent No. 293,720, dated February 19, 1884.

Application filed November 24, 1883. (No model.)

*To all whom it may concern:*

Be it known that we, FISHER DOHERTY and ENOS L. SIES, citizens of the United States, residing at Crawfordsville, in the county of Montgomery and State of Indiana, have invented a new and useful Sulky, of which the following is a specification, reference being had to the accompanying drawings.

This invention relates to that class of sulkies which are designed to relieve the occupant of the vehicle from inconvenience resulting from the motion of the horse.

The object of our invention is to provide a sulky possessing superior advantages in point of simplicity, inexpensiveness, durability, and general efficiency, whereby the occupant will be relieved of all motion of the horse and from any jars or shocks, and which will permit convenient adjustment of the vehicle in relation to the size of the horse.

In the drawings, Figure 1 is a perspective view of a sulky embodying our improvements. Fig. 2 is a rear elevation of the same. Fig. 3 is a vertical longitudinal sectional view thereof. Fig. 4 is a vertical transverse sectional view taken through the axle and looking forwardly. Fig. 5 is a detail side view, illustrating a modification in the connection of the spring-block with the axle. Fig. 6 is a detail side view, illustrating another modification.

Referring to the drawings, A designates the axle which carries the wheels B B, and to which the thills C C are secured, so that their rear ends, $c\ c$, will project in rear of the axle, as shown. These rear ends, $c\ c$, are connected by a cross-bar, D, which is parallel with the axle and in rear thereof.

E E designate blocks, which are disposed at the sides of the vehicle and in a longitudinal plane, so that they are supported upon the axle and upon the cross-bar D. These blocks support the mainsprings F F, which are preferably of the form shown, having their ends $f\ f$ curved upwardly. To enable the convenient adjustment of the thills in relation to the size of the horse, the blocks E E have a hinge-connection with the axle, this connection being formed by a plate, (which is preferably formed of malleable iron,) G, secured to the under side of the blocks, and provided with a downwardly-projecting extension, $g$, at its rear end, and with a transverse cylindrical bearing-arm, $g'$, at its front end, which arm has its bearing in a block or clip, H, secured on the axle. The extension $g$ of plate G is bifurcated or formed with a slot, $g^2$, to accommodate a set-screw, I, by which the rear end of the plate is secured to the cross-bar D. By adjusting this rear end of the plate vertically the blocks E E will turn on their bearings on the axle, and the front ends of the thills will be correspondingly lowered or elevated, as desired, when the parts can be secured in adjusted position by the set-screws II.

As a modification of the hinge-connection of the blocks E E with the axle, the front ends of plates G G can be simply curved around a corresponding cylindrical portion, $a$, of the axle, so that the ends $g^3\ g^3$ can readily turn on the bearings thus formed, as shown in Fig. 5.

From the rear end of the body J projects a bracket, $k$, to which is secured a transverse spring, K, having links or rings L L at its ends, which rings are interlinked with depending rings or links M M on the rear ends of the springs F F. To the under side of the body, at its front portion, are secured forwardly and downwardly projecting flat springs N N, that are connected by a cross-rod, O, having links P P at its ends, which links are interlinked with rings or links Q Q, depending from the front ends of springs F F. By this arrangement of springs and links the body has a longitudinal and lateral swing, so that all jars or motion from the horse or by reason of the wheels falling into a rut or striking an obstruction in the road is received by the springs and their connecting-links, and is not transmitted to occupants of the vehicle. To further enhance the free and easy motion of the body, the seat R may be swung in any suitable manner.

We do not wish to be understood as limiting ourselves to the construction herein shown, as numerous modifications may be made in the construction and arrangement of parts without departing from the spirit and scope of our invention.

Fig. 6 illustrates another modification, in which the joint between the axle and plate G is formed by a spring-steel plate, $P^3$, which is adjustable by means of a set-bolt, $Q^3$, to clamp the plate G to the axle in the desired position.

We claim as our invention—

1. The combination of the axle, the thills secured thereto and projecting in rear thereof, a cross-bar connecting the rear end of the thills, blocks carrying the body, and plates secured to the under sides of these blocks and bearing upon the axle at their front ends, and adjustably connected to the cross-bar at their rear ends, substantially as set forth.

2. The combination of the axle, the thills secured thereto and projecting in rear thereof, a cross-bar connecting the rear ends of the thills, the plates having their front ends bearing upon the axle and provided with the slotted rear extensions, and the set-screws securing these plates to the cross-bar, substantially as set forth.

3. The combination of the axle, the thills, plates having a bearing on the axle and connected with the thills and adjustable on said bearings, the body, and devices connecting the body with the plates, substantially as set forth.

In testimony that we claim the foregoing as our own, we have hereto affixed our signatures in presence of two witnesses.

FISHER DOHERTY.
ENOS L. SIES.

Witnesses:
JOHN E. HUMPHRIES,
BRUCE CARR.